United States Patent
Schulz

(10) Patent No.: US 6,481,638 B1
(45) Date of Patent: Nov. 19, 2002

(54) METHOD AND DEVICE FOR PRODUCING FINE POWDER BY ATOMIZING MOLTEN MATERIAL WITH GASES

(76) Inventor: Gunther Schulz, Gothaer Strasse 33, D-9985 Ohrdruf (DE)

(*) Notice: Subject to any disclaimer, the term of this patent is extended or adjusted under 35 U.S.C. 154(b) by 0 days.

(21) Appl. No.: 09/581,893
(22) PCT Filed: Dec. 14, 1998
(86) PCT No.: PCT/EP98/08180
§ 371 (c)(1),
(2), (4) Date: Jun. 16, 2000
(87) PCT Pub. No.: WO99/30858
PCT Pub. Date: Jun. 24, 1999

(30) Foreign Application Priority Data

Dec. 17, 1997 (DE) .......................... 197 58 111

(51) Int. Cl.[7] .................................. A62C 5/02
(52) U.S. Cl. ...................... 239/8; 239/294; 239/418; 239/424; 239/597
(58) Field of Search .............. 239/8, 290, 294, 239/418, 544, 568, 291, 424, 434, 597, 553.5

(56) References Cited

U.S. PATENT DOCUMENTS 4,405,296 A * 9/1983 Stuck et al. .................. 425/6
4,486,470 A * 12/1984 Stuck et al. ........... 239/DIG. 7
5,320,509 A * 6/1994 Oka .............................. 425/7
5,968,601 A * 10/1999 Leon et la. ............... 239/553.5

FOREIGN PATENT DOCUMENTS

EP 444767 * 1/1991
GB 1379261 * 1/1975

* cited by examiner

Primary Examiner—Lesley D. Morris
Assistant Examiner—Dinh Q. Nguyen
(74) Attorney, Agent, or Firm—R W Becker & Associates; R W Becker

(57) ABSTRACT

A method and nozzle for producing fine powder by atomizing molten material with gas are provided. Molten material, in the form of a film, flows out of a molten material nozzle that has an essentially rectangular discharge cross-sectional area. Thereafter, the molten material, together with an atomizing gas, flows through an initially converging and then diverging gas nozzle that is in the form of a linear Laval nozzle, has an essentially rectangular cross-sectional area, and through which flow is laminar. Laminar accelerated gas flow stabilizes and simultaneously stretches the film of molten material in the converging portion of the Laval nozzle until the film of molten material, after passing the narrowest cross-sectional area of the Laval nozzle, is uniformly atomized over its entire length.

15 Claims, 1 Drawing Sheet

Figure 1:
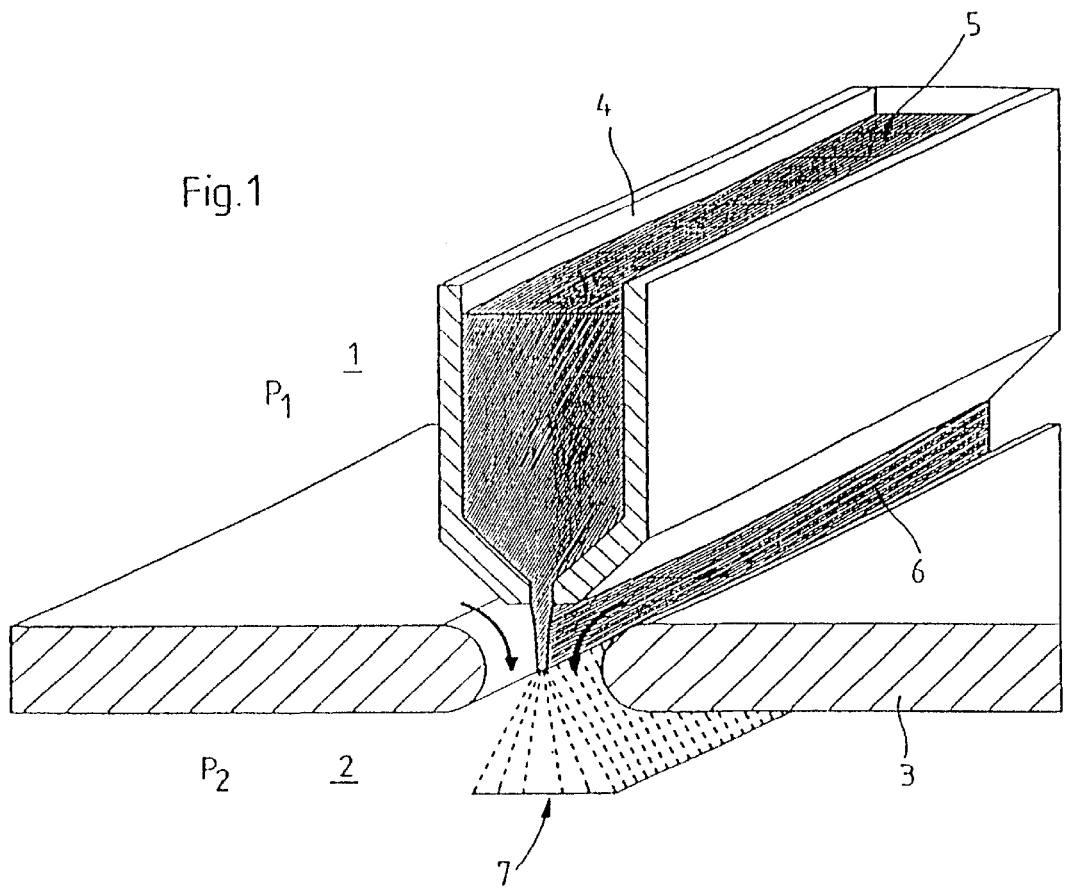

METHOD AND DEVICE FOR PRODUCING FINE POWDER BY ATOMIZING MOLTEN MATERIAL WITH GASES

BACKGROUND OF THE INVENTION

The present invention relates to a method and nozzle for producing fine powder, preferably having a spherical physical appearance, by atomizing molten material with gases such as known for EP-A-0444-767.

To produce metal powders, gas atomization techniques are known throughout the industry. Different nozzle constructions are utilized, all of which have in common that a pressurized atomization gas escapes from one or more gas nozzles and, as a turbulent stream, approaches at an angle molten material flowing out of a molten material nozzle and atomizes such molten material. An overview of various nozzle constructions is provided, for example, by A. J. Yule and J. J. Dunkley "Atomization of Melts", Oxford, 1994, pages 165 to 189. On its way to the molten material, the gas loses a large portion of its energy. With atomization gas pressures up to about 35 bar, relatively coarse metal powder having average granular diameters $d_{50}$ in the atomization state of about 50 µm and greater result. The thus produced powders generally have a broad granular size distribution because the atomization pulse is subjected to great deviations due to the turbulence. J. Ting, et al., "A novel high pressure gas atomizing nozzle for liquid metal atomization", Adv. Powder Metallurgy and Particulate Materials, 1996, pages 97 to 108, discloses special high pressure nozzles having operating pressures of up to 100 bar, which at a very high gas consumption can produce average granular sizes of about 20 µm. All known methods having turbulent gas flow are unsuitable for the direct production of fine powders having average granular diameters $d_{50}$ of about 10 µm.

DE 33 11 343 A1 discloses a method of producing fine metal powders as well as a device for carrying out the method, and proposes the use of laminar gas streams in a concentric Laval nozzle having preheated atomizing gas. The molten material nozzle is positioned in such a way that it is disposed in the converging portion of the Laval nozzle, i.e., that the molten material nozzle extends into the Laval nozzle. The flow in the upper portion of the Laval nozzle is laminar. In contrast to methods having turbulent gas flows, finer powder with a narrower granular size distribution, accompanied by relatively low specific gas consumption, result, as illustrated, for example, in FIG. 2 of the publication of G. Schulz, "Laminar sonic and supersonic gas flow atomization" PM²TEC '96, World Congress On Powder Metallurgy And Particulate Materials, U.S.A., 1996, pages 1 to 12. The specific gas consumption for the production of a steel powder having an average granular diameter of 10 µm is approximately 7 to 8 Nm³Ar/kg corresponding to about 12.5 kg to 14.2 kgAr/kg steel.

DE 35 33 964 C1 discloses a method and an apparatus for producing very fine powders in spherical form, according to which the atomizing gas is introduced via a radially symmetrical, heatable gas hopper into the Laval nozzle, whereby the metal exiting the molten material nozzle, which is placed within this gas hopper, is overheated or heated by heat transfer via radiation, which originates from the heated gas hopper.

DE 37 37 130 A1 similarly discloses a method and an apparatus for producing very fine powders, according to which the underpressure resulting from the gas flowing in the Laval nozzle is utilized to draw in molten material from a separate molten material device. Here also a radially symmetrical nozzle system having a molten material nozzle placed within the Laval nozzle is involved.

From the publication of G. Schulz, "Laminar sonic and supersonic gas flow atomization—The NANOVAL—Process", Adv. Powder Metall. & Particulate Matter. (1996), 1, pages 43–54, it is furthermore known that for the production of fine metal powder it is necessary to keep the mass flow exiting the radially symmetrical nozzle small if fine powder is to be produced. Indicated here are 12 to 30 kg/h and nozzles with molten material nozzle diameters of 1 mm or less.

Common to all of the previously known methods is that these have serious technical and economical drawbacks. For example, the heretofore utilized concentric or radially symmetrical nozzle systems having molten material nozzle diameters of 1 mm or less, are, due to the type of construction, particularly susceptible to mechanical clogging due to foreign particles or gas bubbles that are carried along. In addition, due to a given unfavorable ratio of outer molten material nozzle surfaces to the molten material volume, great heat losses occur that can effect an undesired congealing of the molten material nozzles and then, as is also the case with the mechanical clogging, result in a termination of the atomization and longer down times. Furthermore, the production capacity that up to now could be achieved is low, and the specific gas consumption is high. During the production of fine powders, the production capacity and the specific gas consumption are very decisive in determining the manufacturing costs. There is therefore a need for an atomizing method that is characterized by low gas consumption and high production capacity.

Taking into account this state of the art, the object of the invention is to improve a method of the aforementioned general type, while avoiding the described drawbacks, in such a way that an economical production of fine, gas-atomized powder is possible. Furthermore, down times due to clogging from impure molten material, and from congealing due to heat losses, are to be avoided. In particular, it should be possible to finely and uniformly atomize metallic, metallic alloy, salt, salt mixture, or also polymeric molten material on a large scale, in an economical manner, and in particular, however, with a low gas consumption and a high molten material throughput. Furthermore, the molten material nozzle should be as stable as possible relative to mechanical clogging from impure molten material as well as relative to congealing.

SUMMARY OF THE INVENTION

The object is inventively realized in that the molten material flows out of a molten material nozzle having an essentially rectangular cross-sectional area in the form of a film, and subsequently, together with an atomizing gas, issues through an initially converging and then diverging gas nozzle that is in the form of a linear Laval nozzle, has an essentially rectangular cross-sectional area, and through which flow is laminar, whereby the laminar accelerated gas flow stabilizes and simultaneously stretches the film of molten material in the converging portion of the Laval nozzle until the film of molten material, after passing the narrowest cross-sectional area, is uniformly atomized over its entire length.

Surprisingly, it is possible to stabilize the film of molten material, which is primarily issuing from the essentially rectangular molten material nozzle, and that would be unstable due to its large surface area by virtue of free discharge, by the introduction into the accelerated gas stream in the converging portion of the similarly essentially rectangular Laval nozzle. In so doing, an extremely favorable relationship of powder molten material nozzle surface to the molten material volume is achieved, so that clogging due to congealing is precluded. Furthermore, individual foreign particles in impure molten material can in the most unfavorable situation affect only a small portion of the cross-sectional area of the molten material nozzle, so that the atomizing process is also not terminated under such conditions. Below the narrowest cross-sectional area of the Laval nozzle, the film of molten material is uniformly atomized with high specific pulse to a fine powder that preferably has a spherical physical appearance.

Pursuant to a further advantageous proposal of the invention, the ratio of the pressure above the Laval nozzle and below the Laval nozzle corresponds at least to the critical pressure ratio of the atomizing gas that is utilized, so that the gas reaches the speed of sound in the narrowest cross-sectional area of the Laval nozzle. The pressure ratio is advantageously >2, preferably >10.

Pursuant to a further advantageous proposal of the invention, the atomizing gas is preheated. Pursuant to a further advantageous proposal the molten material issuing from the molten material nozzle is heated via radiation. The preheating of the atomizing gas, and the heating-up of the molten material via radiation, are, however, not necessary prerequisites for being able to carry out the method. A preheating of the atomizing gas, and a heating-up of a molten material issuing from the molten material nozzle via radiation, are preferably dispensed with, as a result of which on the one hand the capital outlay for equipment is considerably reduced, and on the other hand energy is saved.

Pursuant to a further advantageous proposal of the invention, impure molten material is also atomized by the molten material nozzle. Metals, metal alloys, salts, salt mixtures, or synthetic materials that can be melted, such as polymers, are advantageously utilized as molten material that is to be atomized.

Pursuant to a further advantageous proposal of the invention, the molten material that is to be atomized does not react with the atomizing gas, in other words, is inert relative to the gas. If the material that is to be atomized does not react with the atomizing gas, in other words is inert relative to the gas, spherical particles form from the molten material droplets under the influence of surface tension. Pursuant to a further proposal of the invention, the molten material that is to be atomized reacts entirely or partially with the atomizing gas. If the material that is to be atomized, in other words the molten material, reacts entirely or partially with the atomizing gas, reaction products are thereby formed that can prevent the molten material droplets from forming into spheres, so that irregularly formed powder particles are formed. If a substrate is advantageously introduced into the particle stream at a distance at which the particles are at least still partially liquid, the direct production of a semi-finished product is possible, a so-called atomizing compaction.

Pursuant to the method, the ratio of the cross-sectional surfaces of the molten material nozzle discharge to the narrowest cross-sectional area of the Laval nozzle with linear systems is always greater than with radially symmetrical nozzles. Since the throughput quantities of gas and metal and the like under otherwise identical conditions are proportional to the corresponding nozzle cross-sectional areas, pursuant to the method there results linear systems having lower specific gas consumptions. The savings increases with the length of the nozzle system. Due to the proportionality of molten material nozzle cross-sectional area and molten material throughput, by adaptation of the nozzle length every desired production capacity can be set in a simple manner. The characteristic properties of metal powder, such as granular size, width of the granular size distribution, and granular shape, thereby remain unchanged, in contrast to which pursuant to the method the specific gas consumption drops.

As a device for carrying out the method of the invention a nozzle for atomizing molten material is inventively proposed that has a molten material nozzle and a gas nozzle disposed below the discharge thereof in the direction of flow, with the inventive nozzle being characterized in that the molten material nozzle has an essentially rectangular discharge cross-sectional area, in that the gas nozzle also has an essentially rectangular cross-sectional area in the form of a linear Laval nozzle, and in that the gas nozzle generates an initially converging, laminar accelerated gas flow that stabilizes and simultaneously stretches the film of molten material until after passing the narrowest cross-sectional area in the diverging portion of the gas nozzle the film of molten material is uniformly atomized over its entire length. As a consequence of the inventive nozzle with an essentially rectangular cross-sectional area, in other words, a rectangular or substantially rectangular cross-sectional area, the cross-sectional area can, by altering the length of the rectangle, be adapted in such a way that every desired molten material throughput can be achieved and in this way a high production capacity results.

Pursuant to one advantageous proposal of the invention, the discharge cross-sectional area of the molten material and/or the Laval nozzles are modified in such a way that the two short sides of the rectangle of the nozzle cross-sectional area are replaced by semi circular arcs having a diameter corresponding to the length of the short sides, so that a substantially rectangular cross-sectional area is provided.

Pursuant to a further particularly advantageous proposal of the invention, the ratio of the long side of the rectangle and the short side of the rectangle of the discharge cross-sectional area of the molten material and/or of the Laval nozzles is at least >1 preferably >2, and especially preferably >10. Pursuant to a further advantageous proposal of the invention, the length of the linear Laval nozzle in the narrowest cross-sectional area is greater than the length of the molten material nozzle. Advantageously, the ratio of the width of the Laval nozzle to the width of the molten material nozzle >1 and <100, preferably <10.

Pursuant to a further particularly advantageous proposal of the invention, the molten material throughput is adapted to the desired production capacity by lengthening the long side of the molten material nozzle and corresponding lengthening of the long side of the Laval nozzle by the same amount, without thereby altering the granular size of the powder that is to be produced or increasing the specific gas consumption.

BRIEF DESCRIPTION OF PREFERRED EMBODIMENTS

Figure 2:
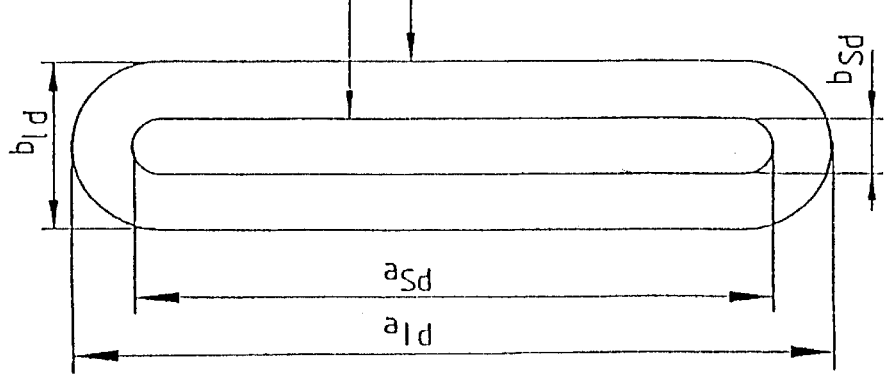

Further details, features and advantageous of the present invention can be seen from the following description of the pertaining drawings, in which one preferred specific embodiment of the invention is schematically illustrated. Shown are:

FIG. 1 a schematic perspective view showing the inventive atomization principle, and FIG. 2 a projection of the discharged cross-sectional area of the molten material nozzle onto the narrowest cross-sectional area of the Laval nozzle.

DESCRIPTION OF PREFERRED EMBODIMENTS

FIG. 1, in a schematic perspective view, shows the method and apparatus of the atomizing principle. A gas chamber 1 having a high pressure $p_1$ is separated from a gas chamber 2 having low pressure $p_2$ by an initially converging and then diverging gas nozzle 3, which has an essentially rectangular cross-sectional configuration and is in the form of a linear Laval nozzle. The pressure ratio $p_1/p_2$ above the Laval nozzle and below the Laval nozzle corresponds to at least the critical pressure ratio of the atomizing gas that is utilized, so that in the narrowest cross-sectional area of the Laval nozzle 3 the gas reaches the speed of sound. The greater is the atomizing gas pressure $p_1$, the finer is the resulting powder. The molten material 5 flows out of the film-forming molten material nozzle 4, which has an essentially rectangular discharge cross-sectional area, in the form of a film. In this connection, the molten material nozzle 4 is embodied as a casting distributor or melting crucible. The molten material 5 of the material that is to be atomized is produced and made available via known techniques. The discharge of the molten material nozzle 4 is positioned above the Laval nozzle 3 and is oriented parallel thereto. As a consequence of the pressure differential the atomizing gas flows from the gas chamber 1 into the gas chamber 2. In the converging portion of the Laval nozzle 3 the gas is accelerated in a laminar flow in the narrowest cross-sectional area until the speed of sound is reached. The gas always flows with a greater speed than does the molten material 5, and stabilizes, stretches and accelerates the film 6 of molten material. Below the narrowest cross-sectional area of the Laval nozzle 3, the thin film 6 of molten material is finally atomized with high specific pulse over its entire length and uniformly to a fine particle stream 7 of droplets of molten material that then give off their heat and solidify to a fine powder. The stable, thin film 6 of molten material is the prerequisite for the production of particularly fine powder having an average granular diameter $d_{50}$ of about 10.

FIG. 2 shows a projection of the discharge area 8 of the molten material nozzle 4 upon the narrowest cross-sectional area 9 of the Laval nozzle 3. The discharge cross-sectional area 8 of the molten material nozzle 4, and the narrowest cross-sectional area 9 of the Laval nozzle 3, are provided at the two short sides $b_{sd}b_{ld}$ with circular arcs having a diameter corresponding to the lengths of the short sides $b_{sd}b_{ld}$ so that in each case a substantially rectangular cross-sectional area is provided. The ratio, which is not actual size, shown in FIG. 2 of the long rectangular sides $a_{sd}a_{ld}$ of the discharge cross-sectional area 8 of the molten material nozzle 4 and of the narrowest cross-sectional area 9 of the Laval nozzle 3, and the short rectangular sides $b_{sd}b_{ld}$ of the discharge cross-sectional area 8 of the molten material nozzle 4 and of the narrowest cross-sectional area 9 of the Laval nozzle 3 is >10. The length $a_{ld}$ of the narrowest cross-sectional area 9 of the Laval nozzle 3 is greater than the length $a_{sd}$ in the discharge cross-sectional area 8 of the molten material nozzle 4. The ratio $b_{ld}/b_{sd}$ of the width $b_{ld}$ of the Laval nozzle 3 to the width $b_{sd}$ of the molten material nozzle 4 is here >1 and <10.

The production of fine powder by atomizing molten material with gases pursuant to the method is described in the following examples:

EXAMPLE 1

Tin solder molten material Sn62Pb36Ag2 having a temperature of 400° C. is issued from a graphite molten material nozzle having a rectangular discharge cross-sectional area of 15 mm² with a length of 30 mm and a diameter of 0.5 mm. The Laval nozzle that is used has at its narrowest cross-sectional area a length of 33 mm and a thickness of 3.0 mm. The atomizing gas is nitrogen having an overpressure $p_1$ of 20 bar over ambient pressure. In the gas chamber 2, the so-called atomizing tower, there is also disposed nitrogen having an overpressure $p_2$ of 0.1 bar. The atomization takes place at a molten material throughput of 143 g/s corresponding to 8.6 kg/min=516 kg/h at a specific gas consumption of 2.8 kg nitrogen ($N_2$) per kg metal. The achieved average granular diameter of the produced powder is 9 μm.

EXAMPLE 2

Molten steel material of the alloy 42 Cr Mo 4, material number 1.7225, at a temperature of 1750° C., is issued out of a zircon dioxide molten material nozzle having a substantially rectangular cross-sectional opening of 35 mm², a length of 50 mm, and a diameter of 0.7 mm. The Laval nozzle, at its narrowest cross-sectional area, has a length of 55 mm and a thickness of 3.5 mm. The atomizing gas is argon having an overpressure $p_1$ of 30 bar over ambient pressure. Disposed in the atomizing tower 2 is again nitrogen having an over pressure $p_2$ of 0.1 bar. The atomization is effected at a molten material throughput of 333 g/s corresponding to 20 kg/min, corresponding to 1200 kg/h at a specific gas consumption of 4.5 kg argon (Ar) per kg metal. An average granular diameter of the manufacturing powder of 9.5 μm was achieved.

EXAMPLE 3

A silver molten material having a temperature of 1060° C. issued out of a graphite molten material nozzle having a substantially rectangular discharge cross-sectional area of 20 mm² at a length 20 mm and a diameter of 1.0 mm. The Laval nozzle at its narrowest cross-sectional area had a length of 24 mm and a thickness of 4.0 mm. The atomizing gas was nitrogen (N₂) having an overpressure $p_1$ of 18 bar over ambient pressure. In the atomizing tower 2 there was again disposed nitrogen (N₂) having an overpressure $p_2$ of 0.1 bar. The atomization was effected at a molten material throughput of 233 g/s corresponding to 14 kg/min, corresponding to 840 kg/h at a specific gas consumption of 1.67 kg nitrogen (N₂) per kg metal. An average granular diameter of 9.0 μm was achieved.

EXAMPLE 4

An aluminum molten material having a temperature of 800° C. was issued from an alumina molten material nozzle (Al₂ O₃) having a substantially rectangular discharge cross-sectional area of 120 mm² at a length of 200 mm and a diameter of 0.6 mm. The Laval nozzle, at its narrowest cross-sectional area, has a length of 205 mm and a thickness of 3.0 mm. The atomizing gas is a mixture of nitrogen and oxygen having an oxygen content of 1% with an overpressure $p_1$ of 30 bar over ambient pressure. In the atomizing tower 2 there is again disposed the nitrogen/oxygen mixture having an overpressure $p_2$ of 0.2 bar, whereby small quantities of the oxygen react with aluminum particles on the surface and form a thin, stable oxide layer. The atomization is effected at a molten material throughput of 785 g/s corresponding to 74.1 kg/min, corresponding to 2826 kg/h at a specific gas consumption of 5.9 kg nitrogen (N₂) per kg metal. An average granular diameter of 10.1 μm was achieved.

EXAMPLE 5

A potassium chloride molten material having a temperature of 820° C. was issued out of a graphite molten material nozzle having a substantially rectangular discharge cross-sectional area of 30 mm² at a length of 30 mm and a diameter of 1.0 mm. The Laval nozzle has at its narrowest cross-sectional area a length of 33 mm and a thickness of 3.5 mm. The atomizing gas is air having an overpressure $p_1$ of 20 bar over ambient pressure. In the atomizing tower 2 there is again disposed air having an overpressure $p_2$ of 0.1 bar. The atomization is effected at a molten material throughput of 220 g/s corresponding to 13.2 kg/min, corresponding to 792 kg/h at a specific gas consumption of 22.1 kg air per kg salt. An average granular diameter of 8.5 μm was achieved.

EXAMPLE 6

A polyethylene molten material (LDPE), at a temperature of 175° C., is issued out of a stainless steel molten material nozzle having a rectangular discharge cross-sectional area of 15 mm² at a length of 30 mm and a diameter of 0.5 mm. The Laval nozzle, at its narrowest cross-sectional area has a length of 33 mm and a thickness of 3.0 mm. The atomizing gas is nitrogen (N₂) having an overpressure $p_1$ of 10 bar over ambient pressure. In the atomizing tower 2 there is again disposed nitrogen (N₂) having an overpressure $p_1$ of 0.1 bar. The atomization is effected at a molten material throughput of 20 g/s corresponding to 1.2 kg/min, corresponding to 72 kg/h at a specific gas consumption of 9.1 kg nitrogen (N₂) per kg polymer. An average granular diameter of 20 μm was achieved.

The specification incorporates by reference the disclosure of German priority documents DE 197 58 111.0 of Dec. 17, 1997 and German Patent Application priority document PCT/EP98/08180 of Dec. 14, 1998.

The present invention is, of course, in no way restricted to the specification disclosure of the specification and drawings, but also encompasses any modifications within the scope of the appended claims.

List of Reference Numerals

1. Gas chamber having pressure $p_1$.
2. Gas chamber having pressure $p_2$.
3. Laval nozzle.
4. Molten material nozzle.
5. Molten material.
6. Film of molten material.
7. Stream of particles.
$p_1$ pressure above the Laval nozzle.
$p_2$ pressure above the Laval nozzle.
$a_{sd}$ length of the molten material nozzle.
$b_{sd}$ width of the molten material nozzle.
$a_{id}$ length of the Laval nozzle.
$b_{id}$ width of the Laval nozzle.

What is claimed is:

1. A method of producing fine powder, by atomizing molten material with gas, including the steps of:

causing molten material to flow, in a form of a film, out of a molten material nozzle having an essentially rectangular discharge cross-sectional area; and thereafter causing said molten material, together with an atomizing gas, to flow through an initially converging and then diverging gas nozzle that is in the form of a linear Laval nozzle, has an essentially rectangular cross-sectional area, and through which flow is laminar, whereby a laminar accelerated gas flow stabilizes and simultaneously stretches said film of molten material in the converging portion of said Laval nozzle until said film of molten material, after passing a narrowest cross-sectional area of said Laval nozzle, is uniformly atomized over an entire length thereof.

2. A method according to claim 1, wherein a ratio of pressure above said Laval nozzle to pressure below said Laval nozzle is set at least to a critical pressure relationship of the atomizing gas that is utilized such that in said narrowest cross-sectional area of the Laval nozzle said atomizing gas reaches the speed of sound.

3. A method according to claim 2, wherein said pressure ratio is set to a value >2, preferably >10.

4. A method according to claim 1, which includes the step of preheating said atomizing gas.

5. A method according to claim 1, which includes the step of heating molten material that issues from the molten material nozzle by means of radiation.

6. A method according to claim 1, which includes the step of also atomizing contaminated or impure molten material by said molten material nozzle.

7. A method according to claim 1, which includes the step of using a metal, a metal alloy, a salt, a salt mixture or a synthetic material that can melt as molten material that is to be atomized.

8. A method according to claim 1, which includes the step of using an atomizing gas with which said molten material that is to be atomized does not react.

9. A method according to claim 1, which includes the step of using an atomizing gas with which said molten material that is to be atomized reacts entirely or partially.

10. A nozzle for atomizing molten material with gas for producing fine powder, comprising:

a molten material nozzle having an essentially rectangular discharge cross-sectional area; and a gas nozzle disposed downstream of said molten material nozzle below said discharge cross-sectional thereof, wherein said gas nozzle is in the form of a Laval nozzle and also has an essentially rectangular cross-sectional area, wherein said gas nozzle generates an initially converging laminar accelerated gas flow in a converging portion thereof that stabilizes and simultaneously stretches a film of molten material flowing there through, and wherein said film of molten material, after passing a narrowest cross-sectional area of said gas nozzle, is uniformly atomized over its entire length in a diverging portion of said gas nozzle.

11. A nozzle according to claim 10, wherein a shortest sides of the essentially rectangular cross-sectional areas of at least one of said molten material nozzle material and said gas nozzle are formed by semicircular arches having a diameter that corresponds to a length of said short sides, so that an essentially rectangular cross-sectional area results.

12. A nozzle according to claim 11, wherein a ratio of long sides of said rectangle to short sides of said rectangle of cross-sectional areas of at least one of said molten material nozzle and said gas nozzle is at least >1, preferably >2, and especially preferably >10.

13. A nozzle according to claim 12, wherein a ratio of said gas nozzle to a width of said molten material nozzle is >1 and <100, preferably <10.

14. A nozzle according to claim 11, wherein a length of said gas nozzle in said narrowest cross-sectional area thereof is greater than a length of said molten material nozzle.

15. A nozzle according to claim 11, wherein a lengthening of a long side of said molten material nozzle and a corresponding lengthening of a long side of said gas nozzle by the same amount adapts a molten material throughput to a desired production capacity without altering a granular size of powder or increasing a specific gas consumption.

* * * * *